Patented June 2, 1925.

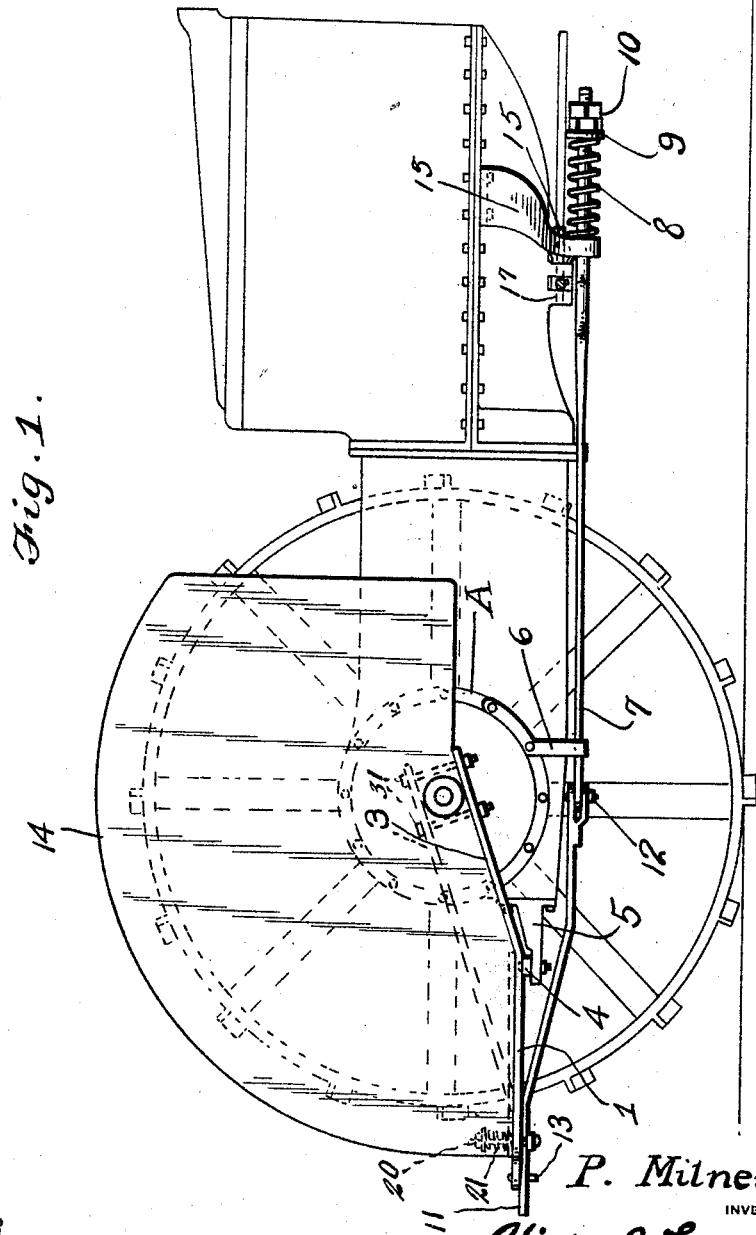

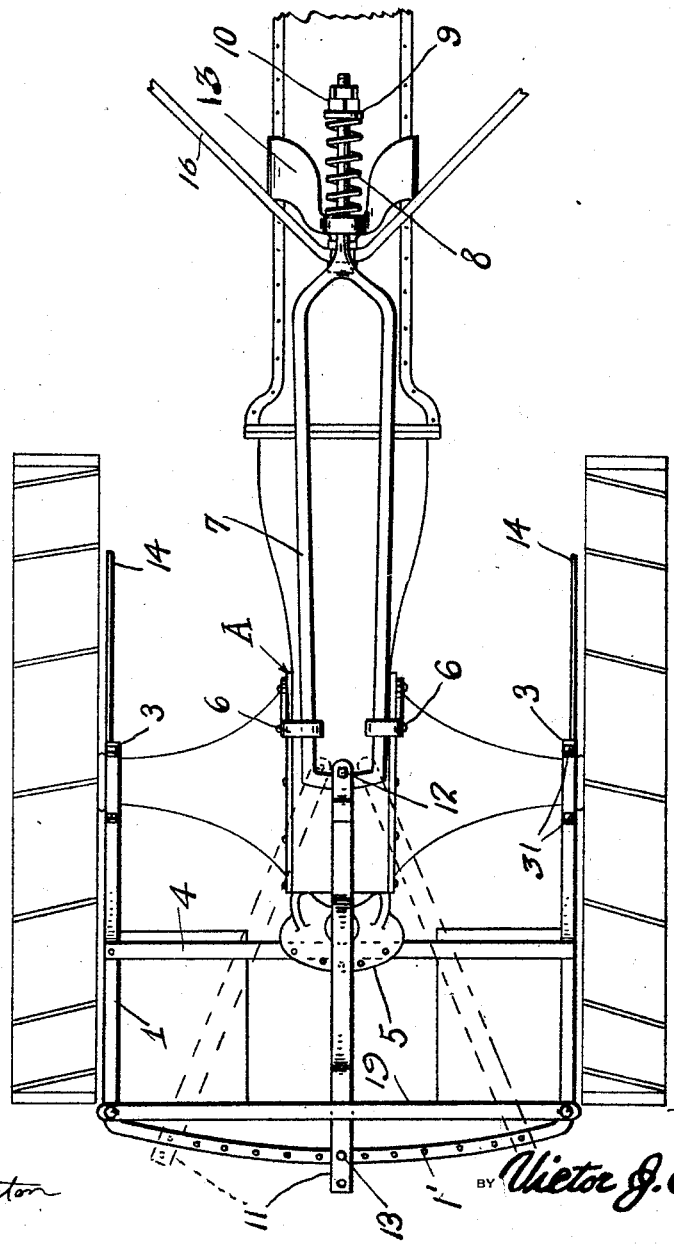

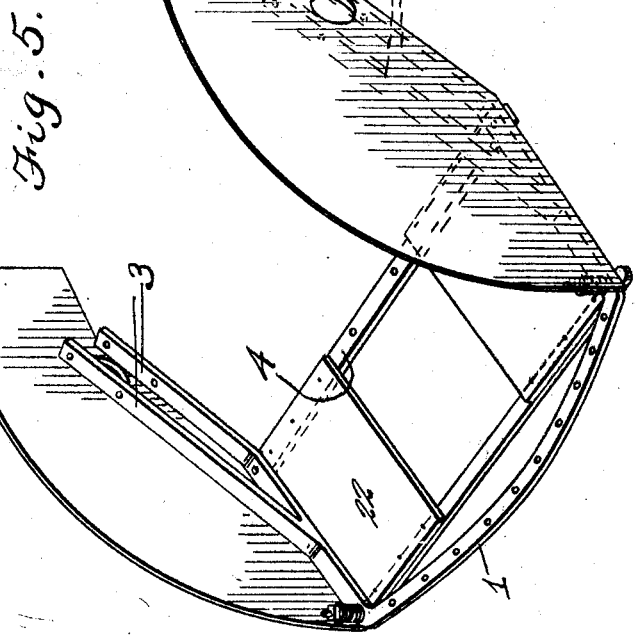
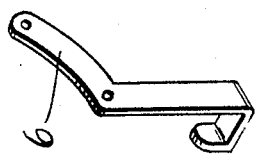
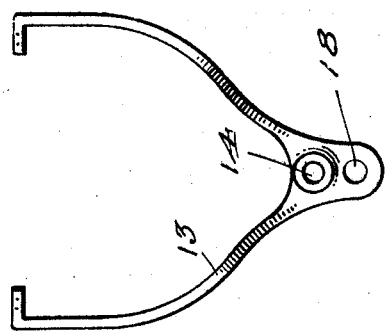

1,540,413

UNITED STATES PATENT OFFICE.

PLESANT MILNER, OF CROWLEY, LOUISIANA.

TRACTOR ATTACHMENT.

Application filed February 27, 1924. Serial No. 695,590.

*To all whom it may concern:*

Be it known that I, PLESANT MILNER, a citizen of the United States, residing at Crowley, in the parish of Acadia and State of Louisiana, have invented new and useful Improvements in Tractor Attachments, of which the following is a specification.

This invention relates to an attachment for tractors, the general object of the invention being to provide improved means for attaching a draw bar to the tractor so as to permit the tractor to make short turns and to eliminate the danger of the tractor rearing up under a heavy pull.

Another object of the invention is to provide a fender which is used when harvesting rice and other crops in muddy ground.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view or portion of a tractor showing my invention in use.

Figure 2 is a bottom plan view of Figure 1.

Figure 3 is a view of one of the brackets 6.

Figure 4 is a view of the yoke member 7.

Figure 5 is a view of the U-shaped bracket for holding the stem of the member 7.

Figure 6 is a perspective view of the platform frame and the fenders.

In these views, 1 indicates a platform frame which is of substantially U-shape and each limb is provided with a pair of extensions 3 which are adapted to be fastened to the ends of the rear axle housing A of the tractor by the bolts 3'. A cross bar 4 is connected with limbs of the frame 1 and is adapted to be fastened to the draw bar cap 5. A hook-shaped bracket 6 is fastened to each side of the lower part of the housing A by some of the bolts of the housing and the hook-shaped parts of these brackets slidingly support the yoke member 7 which has its stem 7' passing through a U-shaped bracket 13 which has its bent extremities engaged by some of the crank case bolts of the tractor and has a hole 14 therein for receiving the bolt 15 which holds the radius rod 16 of the tractor to the depending lugs 17 formed on the bottom of the crank case. This bracket 13 is provided with a hole 18 for receiving the stem and a spring 8 is placed on the stem and bears against the bracket 13 and a washer 9 which is held on the stem by the nut 10. The draw bar 11 is movably connected with the bight of the member 7 by the bolt 12 so that it has play on said member as shown in dotted lines in Figure 2. The draw bar may be adjustably connected with the rear end of the frame 1 by having a pin 13 placed in any one of a number of holes 1' formed in said frame. It is also frictionally held against the frame by means of the cross bar 19 which has its ends connected with the frame 1 by the bolts 20 and the springs 21 so that the bar 19 will press the draw bar against the bight of the frame 1. Fenders 14 may be arranged at the sides of the platform frame when the tractor is to be used for harvesting rice and other crops in muddy ground and plates 22 extend inwardly over portions of the frame 1 to prevent the operator from being splashed with mud.

A tractor equipped with these attachments will be permitted to make turns when attached to an implement and it will be prevented from rearing up when making a heavy pull. The spring acts as shock absorbers, relieving strain on the clutch and gearing of the tractor when starting up and the low draw bar pull makes it easier to steer the tractor as the front wheels will stay on the ground.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a tractor, a bracket connected with the under part of the crank case and having an eye therein, a yoke member having a stem thereon passing through the eye, a spring on the stem and bearing against a part thereon and against the bracket, a draw bar movably connected with the bight of the yoke member, a platform frame connected with the rear part of the tractor and means for adjustably connecting the draw bar with said platform.

2. In combination with a tractor, a platform frame connected with the rear part thereof, a yoke-shaped member having a stem, a bracket connected with the crank case and having a hole therein through which the stem passes, a spring on the stem and a nut for holding the spring between itself and the bracket, a draw bar movably connected with the bight of the member, a spring pressed bar for pressing the draw bar against a portion of the platform frame, a cross bar connected with the frame and with the draw bar cap and brackets connected with a part of the shaft housing and slidingly support the rear part of the yoke member.

3. In combination with a tractor, a platform frame connected with the rear part thereof, a yoke-shaped member having a stem, a bracket connected with the crank case and having a hole therein through which the stem passes, a spring on the stem and a nut for holding the spring between itself and the bracket, a draw bar movably connected with the bight of the member, a spring pressed bar for pressing the draw bar against a portion of the platform frame, a cross bar connected with the frame and with the draw bar cap, brackets connected with a part of the shaft housing and slidingly support the rear part of the yoke and a fender connected with each side edge of the platform.

In testimony whereof I affix my signature.

PLESANT MILNER.